United States Patent
Erceis

(10) Patent No.: US 11,636,507 B2
(45) Date of Patent: *Apr. 25, 2023

(54) SLOW NETWORK DETECTION AND RESPONSE

(71) Applicant: Quantcast Corporation, San Francisco, CA (US)

(72) Inventor: Gurel Erceis, London (GB)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,896

(22) Filed: Jul. 25, 2022

(65) Prior Publication Data
US 2022/0358536 A1 Nov. 10, 2022

Related U.S. Application Data

(63) Continuation of application No. 16/847,108, filed on Apr. 13, 2020, now Pat. No. 11,397,966.

(51) Int. Cl.
*G06Q 30/02* (2012.01)
*H04L 43/08* (2022.01)
(Continued)

(52) U.S. Cl.
CPC ..... *G06Q 30/0242* (2013.01); *G06Q 30/0275* (2013.01); *H04L 41/06* (2013.01);
(Continued)

(58) Field of Classification Search
CPC .......... G06Q 30/0242; G06Q 30/0275; G06Q 30/0244; G06Q 30/0246; H04L 67/62;
(Continued)

(56) References Cited

U.S. PATENT DOCUMENTS 9,996,858 B1 * 6/2018 Flowerday ......... G06Q 30/0275
10,019,728 B1 * 7/2018 Huang ............... G06Q 30/0273
(Continued)

OTHER PUBLICATIONS

United States Office Action, U.S. Appl. No. 16/847,108, dated Dec. 29, 2021, 18 pages.
(Continued)

*Primary Examiner* — Muhammad Raza
(74) *Attorney, Agent, or Firm* — Andrea Wheeler

(57) ABSTRACT

A control system determines whether a browser is retrieving supplemental content over a slow or faulty network using a tracking indicator. Based on determining that browser is retrieving supplemental content over a slow or faulty network, the control system modifies responses to opportunities to provide supplemental content to the browser. The control system may modify responses by declining to bid, responding with a lower bid amount, or responding with alternate supplemental content. Based on determining that browser is no longer retrieving supplemental content over a slow or faulty network, the control system modifies responses to opportunities to provide supplemental content to the browser by responding with a higher bid amount or responding with the original supplemental content. Thus, the control system maximizes the use of control system and campaign manager resources by responding to opportunities according to the likelihood that they will result in an impression or a conversion.

18 Claims, 11 Drawing Sheets

(51) Int. Cl.
*H04L 41/06* (2022.01)
*H04L 67/02* (2022.01)
*H04L 67/62* (2022.01)
*G06Q 30/0242* (2023.01)
*G06Q 30/0273* (2023.01)

(52) U.S. Cl.
CPC .............. *H04L 43/08* (2013.01); *H04L 67/02* (2013.01); *H04L 67/62* (2022.05)

(58) Field of Classification Search
CPC ......... H04L 41/06; H04L 43/08; H04L 67/02; H04L 67/325
See application file for complete search history.

(56) References Cited

U.S. PATENT DOCUMENTS

| | | | |
|---|---|---|---|
| 10,037,545 B1* | 7/2018 | Huang | G06Q 30/0246 |
| 2004/0103024 A1* | 5/2004 | Patel | G06Q 30/0247 |
| | | | 705/14.53 |
| 2011/0246267 A1* | 10/2011 | Williams | G06Q 30/08 |
| | | | 705/14.4 |
| 2015/0051986 A1* | 2/2015 | Sai | G06Q 30/0261 |
| | | | 705/14.71 |
| 2016/0343034 A1* | 11/2016 | Green | H04M 3/42059 |
| 2017/0032038 A1* | 2/2017 | Relkin | G06F 16/29 |
| 2019/0141117 A1* | 5/2019 | Ashner | H04L 67/101 |
| 2020/0219129 A1* | 7/2020 | Andrades | G06Q 30/0246 |

OTHER PUBLICATIONS

United States Office Action, U.S. Appl. No. 16/847,108, dated Jun. 16, 2021, 17 pages.

\* cited by examiner

```
<script async
        data-name="qc-inner-tracker"
        data-account="${QC_ACCOUNT}"
        data-rtbdata="${QC_PIXEL_DATA}"
        data-rand="${QC_RAND}"
        data-consent="gdpr=${GDPR_SIGNAL}&gdpr_consent=${GDPR_CONSENT}"
        src="https://assets.quantcount.com/impl.js?r=${QC_RAND}">
</script>
```

Fig. 3A

```
(function() {
       var me = document.querySelector('script[data-rtbdata][data-name="qc-inner-tracker"]');
    var  data = me.getAttribute('data-rtbdata'),
         account = me.getAttribute('data-account'),
         consent = me.getAttribute('data-consent'),
         rand = me.getAttribute('data-rand');
    var url = '://exch.quantcount.com/pixel/'+account+'.gif?rand='+rand+'&labels=_qc.innerimp&rtbdata2='+data+'&'+consent;
    var img = new Image();
    img.alt="QC Inner Tracker";
    img.src='https' + url;
    img.onerror = function () {
        var img = new Image();
           img.alt="QC Inner Tracker";
           img.src='http' + url;
    };
})();
```

Fig. 3B

SLOW NETWORK DETECTION AND RESPONSE

CROSS-REFERENCE TO RELATED APPLICATIONS

This application is a continuation of U.S. patent application Ser. No. 16/847,108, filed Apr. 13, 2020, all of which is incorporated by reference herein in its entirety.

BACKGROUND

In a real-time automated exchange system, a control system receives a request from an exchange to respond to an opportunity to provide supplemental content to a browser on a publisher site. The control system responds to the opportunity on behalf of a campaign manager. The response includes redirect instructions to be executed by the browser if the control system wins the opportunity. The redirect instructions instruct the browser to retrieve supplemental content from a supplemental content server and to return indications to the control system and the supplemental content server that the supplement content was provided to the browser. The control system receives an indication (i.e., an "initial impression indicator") when the instructions are provided to the browser. The supplemental content server later receives an indication (a "supplemental impression indicator") when the browser receives and renders the supplemental content. If the browser is retrieving the supplemental content server over a slow or faulty network, the browser may never receive the supplemental content at all, or may not receive enough to render a threshold amount of the supplemental content, or a viewer may cause the browser to navigate away from the publisher site before the browser fully renders the supplemental content. In these situations, the supplemental content server will not receive the supplemental impression indicator. Thus, the control system will count the received initial impression indicator as one impression but the supplemental content server will not count an impression. If the control system continues to respond to opportunities corresponding to a browser on a slow network, the control system impression count will exceed the supplemental content server impression count. If the payment from the campaign manager to the control system is based on the total viewed impressions, the campaign manager may reduce or withhold payment to the control system corresponding to the difference in the impression counts. In addition, if the goal of the campaign is to have the content viewed by as many viewers as possible, such as a reach campaign, continuing to respond to opportunities corresponding to the browser on a slow network will reduce the effectiveness of the campaign for the campaign manager.

Furthermore, if a slow network prevents the supplemental content from rendering at all, the consumer can't react to the supplemental content (i.e., "convert"), such as by selecting the supplemental content. If a slow network prevents the supplemental content from fully rendering, the viewer is less likely to react to the supplemental content. If the control system continues to respond to opportunities corresponding to a browser on a slow network, the conversion rate for the campaign will fall. As the payment from the campaign manager to the control system may be based on the conversion rate, the campaign manager may reduce payment to the control system based on the reduced conversion rate. In addition, if the goal of the campaign is to result in as many conversions as possible, such as a direct response campaign, continuing to respond to opportunities corresponding to the browser on a slow network will return fewer conversions and will reduce the effectiveness of the campaign for the campaign manager.

What is needed is a method that enables the control system to identify when a browser is retrieving supplemental content over a slow network, and to adjust responses to opportunities corresponding to the browser in order to use control system and campaign manager resources on opportunities that are likely to result in an impression or a conversion. Such a method would prevent a difference in control system and supplemental content server impression counts, increasing revenue to the control system, and improving campaign effectiveness for the campaign manager.

SUMMARY

Embodiments of the invention include a system, a non-transitory computer-readable storage medium, and a method for a control system to determine that a browser is retrieving supplemental content over a slow or faulty network and to modify responses to opportunities to provide supplemental content to the browser to maximize the use of control system and campaign manager resources on opportunities that are likely to result in an impression or a conversion. Control system resources include computer resources required to respond to opportunities. Campaign manager resources include money budgeted to spend on opportunities to provide supplemental content. The control system responds on behalf of a campaign to an opportunity to provide supplemental content (e.g., advertisements) to a browser on a publisher site. The control system sends a response (or a "bid" or "bid response"), to an exchange, including a pointer to a supplemental content server (e.g., an "ad server"). The exchange uses the pointer to provide redirect instructions to be executed by the browser if the control system wins the opportunity. The response may also include a bid amount. The browser executes the instructions to request and retrieve impression content (e.g., a "pixel") from the control system and to request and retrieve supplemental content instructions from a supplemental content server. Receipt and execution of the request for impression content by the control system is considered an indication that tracking content was received and rendered by the browser (i.e., an "initial impression indicator"). The supplemental content instructions are executed by the browser to request and receive tracking content (e.g., a pixel) from a tracking content server, where the tracking content server is on a different domain than the control system. Receipt and execution of the request for tracking content by the tracking content server is an indication that tracking content was received and rendered by the browser (i.e., a "tracking impression indicator"). The receipt and execution of the request for tracking content by the tracking content server emulates the request and execution of a request for supplemental content, as the browser must form a new connection with the tracking content server and retrieve the tracking content over a network similar to, or the same as, the network used to retrieve the supplemental content. The tracking content server provides the tracking impression indicator to the control system. When the browser is on a fast network, the difference in time between receiving an initial impression indicator and a corresponding tracking impression indicator will be relatively short. When the browser is on a slow or faulty network, the difference in time between receiving an initial impression indicator and a corresponding tracking impression indicator will be relatively long. The control system can use the time difference between the initial impression indicator and the tracking impression indicator to determine that the browser is on a slow network, for example if the time difference exceeds a threshold amount of time. When the browser is on a very slow network or on a very faulty network, a corresponding tracking impression indicator is never received. The control system can use the lack of receipt of a tracking impression indicator within a pre-determined time period after receiving the first impression indicator to determine that the browser is on a slow or faulty network.

When a browser is identified as being on a slow or faulty network, the control system can modify responses to opportunities to provide supplemental content to the browser to minimize use of control system and campaign manager resources on opportunities that are unlikely to result in an impression or a conversion. For example, the control system can stop responding (or respond with a "null" response such as a decline to bid) to opportunities to serve supplemental content to the browser for a pre-determined period of time. The control system can then respond to a single opportunity to serve supplemental content to the browser after the pre-determined period of time. If the time difference between receipt of an initial impression indicator and a corresponding tracker impression indicator, for the single opportunity, is less than the threshold amount of time, the campaign system can identify that the browser is no longer on a slow network. The control system can then resume responding to opportunities to serve supplemental content to the browser. In this way, the control system can resume using its resources to respond to opportunities corresponding to the browser without risking a failure to render, or fully render, the supplemental content and without risking a count difference between the initial impression indicators and the corresponding supplemental impression indicators.

In an another example, when a browser is identified as being on a slow or faulty network, the control system can respond with a pointer to instructions to retrieve a simplified supplemental content that requires less networking capabilities (e.g., less "bandwidth") to retrieve than the supplemental content; for example, a static display instead of a video. Alternatively, the control system can respond with a lower bid price. The control system continues to receive initial impression indicators and tracker impression indicators corresponding to responses comprising lower bid amounts and/or simplified supplemental content. The control system monitors the time difference between the impression indicators. If the time difference between receipt of an initial impression indicator and a corresponding tracker impression indicator is less than the threshold amount of time, the campaign system can identify that the browser is no longer on a slow network. The control system can then resume responding to the opportunities with a higher bid amount and/or more complicated supplemental content.

In both examples, control system and campaign manager resources can focus on opportunities corresponding to other browsers that are more likely to result in supplemental content being fully rendered, or rendered to meet a threshold amount. As a result, the count difference between initial impression indicators and corresponding supplemental impression indicators will be reduced or eliminated. Advantageously, the control system will be financially compensated for opportunities that it wins because there will be little to no difference between initial impressions and corresponding supplemental impressions. In addition, winning opportunities will result in impressions and increased likelihood of conversions, increasing the effectiveness of the campaign.

Embodiments of the non-transitory computer-readable storage medium processor-executable computer program instructions that, when executed, cause a computer processor to perform the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 3A-3B are examples of instructions to request and retrieve content, in accordance with an embodiment of the invention.

DETAILED DESCRIPTION

Embodiments of the invention include a system, a non-transitory computer-readable storage medium, and a method for a control system to identify that an entity is retrieving supplemental content over a slow network and to modify responses accordingly. When an entity is identified as being on a slow network, the control system can modify responses to opportunities to provide supplemental content to the browser to maximize the likelihood that the control system will spend resources on opportunities that are likely to result in an impression and/or a conversion. When an entity is identified as no longer being on a slow network (i.e., is on a fast network), the control system can resume normal operations.

Embodiments of the invention are described below in the context of a real-time automated exchange, such as a real-time advertising exchange, for opportunities to provide supplemental content, such as advertisements, to consumers through entities, such as browsers. It is noted that similar techniques as those described below can be used in providing other types of content to users in the context of other types of exchange systems.

Figure 1:
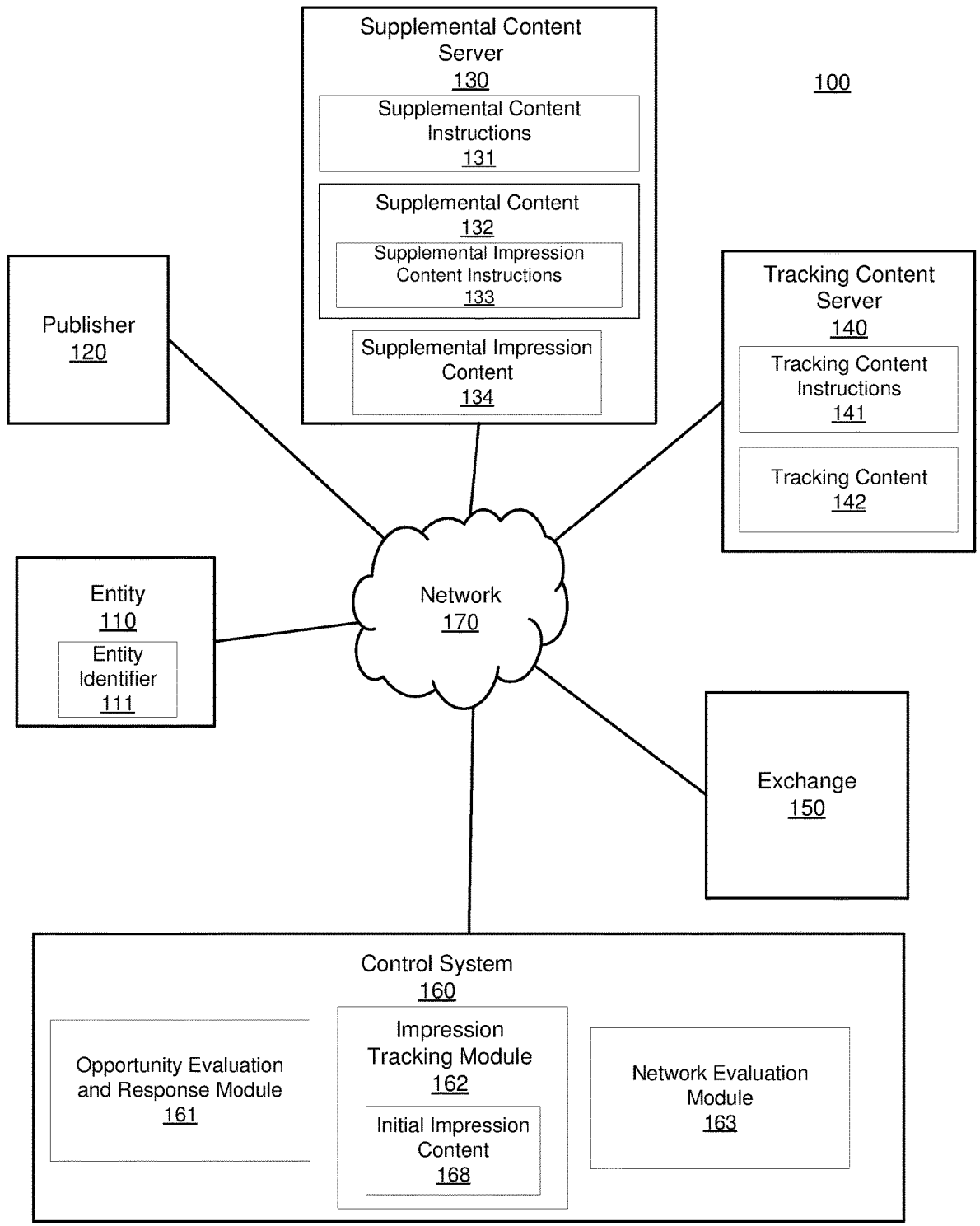
FIG. 1 is a high-level block diagram of a computing environment for a system to identify that an entity is retrieving supplemental content over a slow network and to modify responses accordingly, in accordance with an embodiment of the invention.

FIG. 1 is a high-level block diagram of a computing environment 100 for a control system to identify that an entity is retrieving supplemental content over a slow network and to modify the campaign, according to an embodiment of the invention. The computing environment 100 includes entity 110, publisher 120, supplemental content server 130, tracking content server 140, exchange 150, control system 160, and communication network 170. Although only one of each component of computing environment 100 is illustrated in FIG. 1, the environment can comprise a plurality of any of the components.

Entity 110 accesses publisher 120 over communication network 170. Entity 110 receives and executes instructions to receive and render supplemental content, tracking content, and initial impression content, as described further below. Examples of entity 110 may include software installations, hardware devices, or both. Software installations may include a web entity instance or browser, video viewer instance, a mobile application, or a set-top box software residing on a hardware device. A hardware device may comprise a computer, personal digital assistant (PDA), cell phone, or set-top unit (STU) such as a STU used in conjunction with cable television service. A consumer (or viewer or user) is a person or group of people who accesses publisher 120 through entity 110. For example, a consumer may operate entity 110 installed on a laptop computer to access publisher 120. In some cases, entity 110 comprises a combination of entities which are logically grouped together to represent individuals, households, or groups of individuals who access publisher 120.

Entity 110 may be associated with an entity identifier 111. For example, a hardware device identifier such as a Media Access Control Address (MAC address) can be stored on a device associated with entity 110. A software identifier such as a cookie value can be stored locally. In another embodiment, identifiers used to identify visitors can be composed and/or stored remotely from entity 110 or a device associated with entity 110. In some cases, entity 110 can have multiple identifiers, such as multiple first party cookies and multiple third party cookies, which can be used to identify entity 110 to various systems.

Publisher 120 is a media channel that provides content over communications network 170 to entity 110. Examples of a publisher 120 may include web sites; mobile sites; mobile applications; streaming video services; or network, cable, satellite, or Internet Protocol (IP) television content. Publisher 120 may comprise sites, sub-sites, or pages. Examples of content include textual content; graphical content; networked video or audio; network, cable, satellite, Internet Protocol (IP), or other networked television content; advertising content; and interfaces for interactions such as making purchases. Publisher 120 provides instructions to entity 110 to retrieve and render primary content and notifies exchange 150 of an opportunity to provide supplemental content to be rendered by entity 110.

Supplemental content server 130 contains supplemental content instructions 131, supplemental impression content instructions 133, supplemental content 132, and supplemental impression content 134. Supplemental content server 130 provides supplemental content instructions 131, supplemental impressions content instructions 133, supplemental content 132, and supplemental impression content 134 over communication network 170 to entity 110. Supplemental content server 130 may include additional, fewer, and/or different elements or modules than those shown in FIG. 1. The functionalities may be distributed among the elements or modules in a different manner than described here. Supplemental content server 130 may be managed by publisher 120 or control system 160 or by another entity.

Supplemental content 132 may be an advertisement or "creative." Examples of supplemental content 132 include textual content, graphical content, video content, audio content, or multi-media content that may be embedded in or delivered in conjunction with web pages, networked game displays, television content, mobile application interfaces, multi-media presentations, video content, and audio content. Supplemental content can be a simple exposure or impression, such as a display or a video, which does not enable end-user interaction. Supplemental content may enable end-user interaction such as a selection or "click" that transfers entity 110 to another location (such as to another web page or domain, or to in-game content) or allows a consumer to make a selection.

Supplemental impression content 134 may be a pixel image (i.e., a "pixel"). A pixel image may be a single (i.e., "1×1") pixel. The pixel may be transparent and/or small enough to be undetectable to a consumer operating entity 110. In one embodiment, supplemental content server 130 considers receipt of the request for supplemental impression content 134 as an indication that supplemental content 132 was received and rendered by entity 110 (i.e., as a supplemental impression indicator). In another embodiment, supplemental content server 130 monitors the rendering of supplemental content 132 by entity 110. Supplemental content server 130 considers an indication that supplemental content 132 was fully rendered as the supplemental impression indicator; or supplemental content server 130 considers an indication that a threshold amount of supplemental content 132 was rendered as the supplemental impression indicator.

Tracking content server 140 contains tracking content instructions 141 and tracking content 142. Tracking content server 140 may include additional, fewer, and/or different elements or modules than those shown in FIG. 1. The functionalities may be distributed among the elements or modules in a different manner than described here. Tracking content server 140 provides tracking content instructions 141 and tracking content 142 over communication network 170 to entity 110. Tracking content 142 is rendered by entity 110. Tracking content 142 may be a pixel image (i.e., a "pixel"). A pixel image may be a single (i.e., "1×1") pixel. The pixel may be transparent and/or small enough to be undetectable to a consumer operating entity 110. The receipt and execution of the request for tracking content by the tracking content server emulates the request and execution of a request for supplemental content. In one embodiment, tracking content server 140 may be the same server or on the same domain as supplemental content server 130. Advantageously, in this embodiment, the network connection and handshake to tracking content server 140 by entity 110 will be the same or substantially the same as the network connection and handshake to supplemental content server 130 by entity 110. Thus, the receipt and receipt time of the tracking impression indicator by tracking content server 140 will be substantially the same as the receipt and receipt time of the supplemental impression indicator by supplemental content server 130. In another embodiment, control system 160 does not have access to host tracking content instructions 141 and tracking content 142 on supplemental content server 130. In this embodiment, tracking content server 140 may be on the same server and/or on the same domain as control system 160, or on a different server and/or domain. Tracking content 142 may include additional code or data to increase the time required for entity 110 to retrieve tracking content 142 over communication network 170 to emulate or approximate the time required for entity 110 to connect with supplemental content server 130 and to retrieve supplemental content 132. Preferably, the size of tracking content 142 is substantially the same as the size of supplemental content 132. The additional code may be advantageous in the embodiment where tracking content server 140 is on the same server and/or domain as control system 160. Tracking content server 140 considers receipt of the request for tracking impression content 132 as an indication that tracking content 142 was received and rendered by entity 110 (i.e., as a tracking impression indicator). Tracking content server 140 provides notification of the receipt and receipt time of the tracking impression indicator to control system 160.

Exchange 150 is an electronic marketplace for opportunities to expose entity 110 to supplemental content delivered over a network 170. For example, exchange 150 can be a real time bidding (RTB) advertising exchange that supports the rapid auction of advertising opportunities as they become available. In another example, exchange 150 can be an electronic marketplace for other types of opportunities.

Control system 160 manages and responds to opportunities to provide supplemental content 132 to entity 110 on behalf of campaign managers, such as advertising campaign managers, and tracks impression indicators corresponding to opportunities to which control system 160 responds. Control system 160 comprises opportunity evaluation and response module 161, impression tracking module 162, and network evaluation module 163. Control system 160 may include additional, fewer, and/or different modules than those shown in FIG. 1. The functionalities may be distributed among the modules in a different manner than described here. In one embodiment, opportunity evaluation and response module 161, impression tracking module 162, and network evaluation module 163 may be hosted on a single server system; in another embodiment, opportunity evaluation and response module 161, impression tracking module 162, and network evaluation module 163 may be hosted on different server systems and communicate over communication network 170. Opportunity evaluation and response module 161 receives notifications of opportunities to expose entity 110 to supplemental content 132 from exchange 150 over network 170. Opportunity evaluation and response module 161 assesses an opportunity to determine the suitability of the opportunity for a campaign. If opportunity evaluation and response module 161 determines that an opportunity is suitable for a campaign, opportunity evaluation and response module 161 configures and sends a response to the notification, such as a bid or bid response. The response may comprise a bid price. The response comprises redirect information pointing to supplemental content instructions 131 on supplemental content server 130. If opportunity evaluation and response module 161 determines that an opportunity is unsuitable for a campaign, opportunity evaluation and response module 161 does not sent a response to the notification, or configures and sends a null response to the notification, such as a decline to bid. Impression tracking module 162 receives a request for initial impression content 168 from entity 110. Impression tracking module 162 provides initial impression content 168 (e.g., a pixel) to be rendered by entity 110. Impression tracking module 162 considers receipt of the request for initial impression content 168 to be an indication that supplemental content 134 was received and rendered by entity 110 (i.e., an initial impression indication). Initial tracking module 162 receives notification of receipt and receipt times of tracking impression indicators from tracking content 140. Network evaluation module 163 uses the receipt and receipt times of the initial impression indication and the tracking impression indication to determine whether entity 110 is on a slow network and, if so, to adjust responses to opportunities to provide supplemental content to entity 110, as described further below.

Entity 110, publisher 120, supplemental content server 130, tracking content server 140, exchange 150, and control system 160 are connected by communication network 170. Communication network 170 comprises a local area network, a wide area network, a wireless network, an intranet, a cable network, a satellite network, a cellular phone network, an optical network, and/or the Internet, and/or combinations thereof. Each of the components of computing environment 100 may be connected by different embodiments of communication network 170, each with different network characteristics. For example, one component, such as entity 110, may communicate with another component, such as control system 160, over a "fast" network but may communicate with yet another component, such as supplemental content server 130, over a "slow" network. In an example, a "fast" network may have high available bandwidth or may have little or no significant connectivity issues, while a "slow" or "faulty" network may have a low available bandwidth or significant connectivity issues. For example, a device connected to network 170 over a cellular network may have a slower or more faulty connection than a device connected by WiFi, and a device connected by WiFi may have a slower or more faulty connection than a device on a wired connection. Some cellular networks are slower and have more faults than others have (e.g., 2G is slower than 4G). Some internet service providers provide slower or more faulty network service than others. When entity 110 of computing environment 100 retrieves content over communication network 170, the content may take longer to retrieve and render if it is retrieved over a slow network compared to a fast network. The impact on the retrieval speed will depend on the bandwidth, connectivity, and the size of the file to be downloaded. In an example, entity 110 may retrieve supplemental content 132 with a small file size (e.g., corresponding to a static visual display) in the same amount of time over a slow network or a fast network, but retrieving supplemental content 132 with a large file size (e.g., corresponding to an audio and/or video display) may require significantly more time over a slow network than a fast network.

In an example embodiment of system described above, when entity 110 accesses publisher 120, entity 110 receives instructions from publisher 120 to retrieve primary content to be rendered by entity 110, and publisher 120 notifies exchange 150 of an opportunity to provide supplemental content to be rendered by entity 110.

Exchange 150 is notified by publisher 120 when the opportunity to provide supplemental content to entity 110 becomes available. Exchange 150 provides information about the opportunity in a notification, or request (e.g., a "bid request"), to control system 160. The notification may include entity identifier 111 corresponding to entity 110. Opportunity evaluation and response module 161 of control system 160 evaluates the opportunity and determines that it is suitable for a campaign. Opportunity evaluation and response module 161 configures and sends a bid response to the notification to exchange 150. The bid response may comprise a bid price. The bid response comprises redirect information pointing to supplemental content instructions 131 on supplemental content server 130. Exchange 150 receives the bid response corresponding to the opportunity. Exchange 150 selects the bid response from control system 160 as the winning bid response and sends the redirect instructions corresponding to the winning response to entity 110.

Entity 110 receives redirect instructions from exchange 150 corresponding to the winning response to the opportunity by control system 160. Entity 110 executes the redirect instructions to request supplemental content instructions 131 from supplemental content server 130.

Entity 110 receives and executes supplemental content instructions 131. Supplemental content instructions 131 comprise instructions (e.g., HTML code) for entity 110 to request supplemental content 132 (which comprises supplemental impression content instructions 133) from supplemental content server 130, tracking content instructions 141 from tracking content server 140, and initial impression content 168 from control system 160.

Entity 110 requests and receives supplemental content 132 (which comprises supplemental impression content instructions 133) from supplemental content server 130. Entity 110 renders supplemental content 132. Supplemental impression content instructions 133 comprise instructions (e.g., JavaScript code) for entity 110 to request and render supplemental impression content 134. Entity 110 executes supplemental impression content instructions 133 to request, receive, and render supplemental impression content 134. In one embodiment, supplemental content server 130 considers receipt of the request for supplemental impression content 134 as an indication that supplemental content 132 was received and rendered by entity 110 (i.e., as a supplemental impression indicator). In another embodiment, supplemental content server 130 monitors the rendering of supplemental content 132 by entity 110. Supplemental content server 130 considers an indication that supplemental content 132 was fully rendered as the supplemental impression indicator; or supplemental content server 130 considers an indication that a threshold amount of supplemental content 132 was rendered as the supplemental impression indicator.

Entity 110 requests and receives tracking content instructions 141 from tracking content server 140. Tracking content instructions 141 comprise instructions (e.g., JavaScript code) to request and render tracking content 142. Entity 110 executes tracking content instructions 141 to request, receive, and render tracking content 142. Tracking content server 140 considers receipt of the request for tracking impression content 132 as an indication that tracking content 142 was received and rendered by entity 110 (i.e., a tracking impression indicator). After receiving a tracking impression indicator, tracking content server 140 forwards notification of the receipt and receipt time of the tracking impression indicator to impression tracking module 162 of control system 160.

Entity 110 requests and receives initial impression content 168 from control system 160. Entity 110 renders initial impression content 168.

Impression tracking module 162 of control system 160 considers receipt of the request for initial impression content 168 to be an indication that supplemental content 134 was received and rendered by entity 110 (i.e., an initial impression indication). Impression tracking module 162 of control system 160 receives notification from tracking system 140 of receipt and receipt time of the corresponding tracking impression indicator.

Network evaluation module 163 of control system 160 uses the receipt and receipt times of the initial impression indicator and the tracking impression indicator to determine if entity 110 is on a slow network, as described more fully below. If network evaluation module 163 determines that entity 110 is on a slow network, opportunity evaluation module 161 will determine a modification to responses to opportunities to provide supplemental content to entity 110, as described more fully below.

Figure 2:
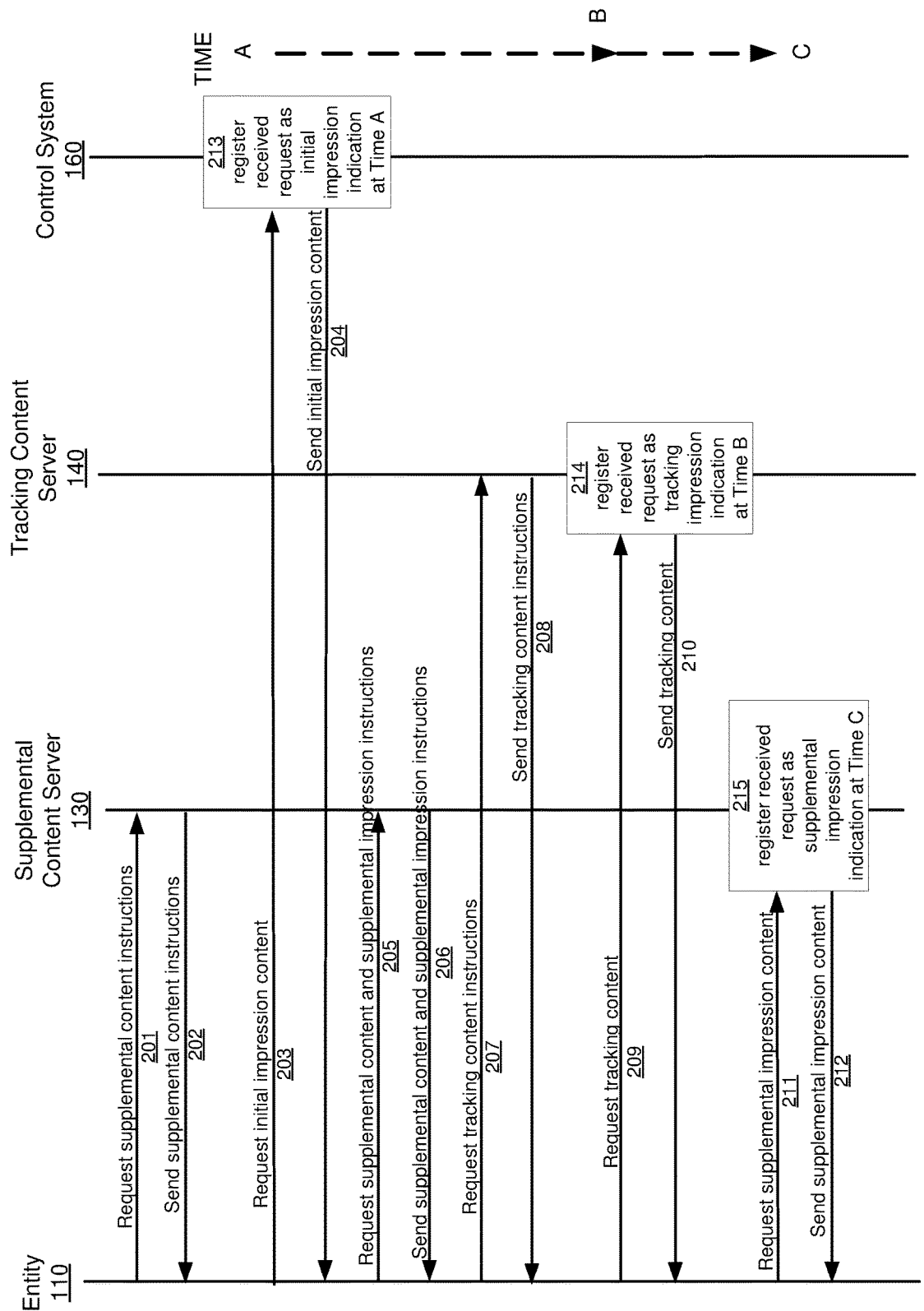
FIG. 2 is an interaction diagram illustrating a method to identify that an entity is retrieving supplemental content over a slow network, in accordance with an embodiment of the invention.

FIG. 2 is a is an interaction diagram illustrating a method for determining the receipt and receipt times of an initial impression indication, tracking impression indication, and supplemental impression indication, in accordance with an embodiment of the invention described above in relation to FIG. 1. It is noted that FIG. 2 is merely illustrating an example embodiment of the invention, and the interactions depicted in FIG. 2 may vary in other examples.

In the example embodiment illustrated in FIG. 2, entity 110 has navigated to publisher 120. Publisher 120 has notified exchange 150 of the opportunity to provide supplemental content 132 to entity 110; exchange 150 has selected a response from control system 160 as the winning response and has forwarded redirect instructions to entity 110.

At 201, entity 110 executes the redirect instructions to request supplemental content instructions 131 from supplemental content server 130.

At 202, supplemental content server 130 provides supplemental content instructions 131 to entity 110.

At 203, entity 110 executes supplemental content 131 instructions to request initial impression content 168 from control system 160.

At 213, at time A, control system 160 receives the request from entity 110 for initial impression content 168. Control system 160 registers the received request as an initial impression indication at time A.

At 204, control system 160 provides initial impression content 168 to entity 110.

At 205, entity 110 executes supplemental content instructions 131 to request supplemental content 132, comprising supplemental impression instructions 133, from supplemental content server 130.

At 206, supplemental content server 130 provides supplemental content 132, comprising supplemental impression instructions 133, to entity 110.

At 207, entity 110 executes supplemental content 131 instructions to request tracking content instructions 141 from tracking content server 140.

At 208, tracking content server 140 provides tracking content instructions 141 to entity 110.

Entity 110 may request initial impression content 168, supplemental content 132, and tracking content instruction 141 in a different order than illustrated in FIG. 2, after receiving supplemental content instructions 131 at 202.

At 209, entity 110 executes tracking content instructions 141 to request tracking impression content 142 from tracking content server 140.

At 214, at time B after time A, tracking content server 140 receives the request from entity 110 for tracking impression content 142. Tracking content server registers the received request as a tracking impression indication at time B.

At 209, tracking content server 140 provides tracking content 142 to entity 110.

At 211, entity 110 executes supplemental impression instructions 133 to request supplemental impression content 134 from supplemental content server 130.

At 215, at time C, after time A, supplemental content server 130 receives the request from entity 110 for supplemental impression content 134. Supplemental content server 130 registers the received request as a supplemental content impression at time C.

At 212, supplemental content server 130 provides supplemental impression content 134 to entity 110.

Entity 110 may request tracking content 142 and supplemental impression content 134 in a different order than illustrated in FIG. 2.

Time B is illustrated as occurring before Time C in FIG. 2. Time B may occur after Time C or at substantially the same time as Time C.

In an embodiment not illustrated, supplemental content server 130 sends monitoring instructions to be executed by entity 110 to measure rendering of supplemental content 132. For example, entity 110 may measure whether supplemental content 132 is fully rendered. In another example, entity 110 may measure what percentage of supplemental content 132 is rendered, or if a threshold amount of supplemental content 132 is rendered. Entity 110 returns to supplemental content 130 the render measurement. In this embodiment, supplemental content server 130 receives the render measurement at a time D after time C. In this embodiment, supplemental content server 130 may register the received render measurement as the supplemental impression indicator at time D.

FIG. 3A is an example of tracking content request instructions included as part of supplemental content instructions 131. Entity 110 executes the tracking content request instructions at step 202 to request tracking content instructions 141 (i.e., "impl.js") from tracking content server 140 (i.e., "https://as sets.quantcast.com").

FIG. 3B is an example of tracking impression instructions 141 sent by tracking content server 140 to entity 110 at step 205. Entity 110 executes tracking content instructions 141 at step 208 to request tracking content 142 (i.e., "QC Inner Tracker") from tracking content server 140 (i.e., "http://exch.quantcount.com"). Additional instructions, or other means of delay, may be included in the tracking content instructions to increase the size of the file and control the amount of time required by entity 110 to download and execute the instructions. For example, if supplemental content 130 comprises a large amount of data, and thus requires a long time to be retrieved and rendered by entity 110, tracking impression instructions 141 can be altered to increase the amount of time required for entity 110 to retrieve and execute them. Control system 160 may estimate the size of supplemental content 132 based on the type of content, such as a banner static ad or a native video ad. Control system 160 may use average sizes of different types and formats of supplemental content to estimate the size of supplemental content 132. Control system 160 may use recommend sizes of different types and formats of supplemental content, such as the Interactive Advertising Bureau (IAB) recommendations, to estimate the size of supplemental content 132.

Figure 4A:
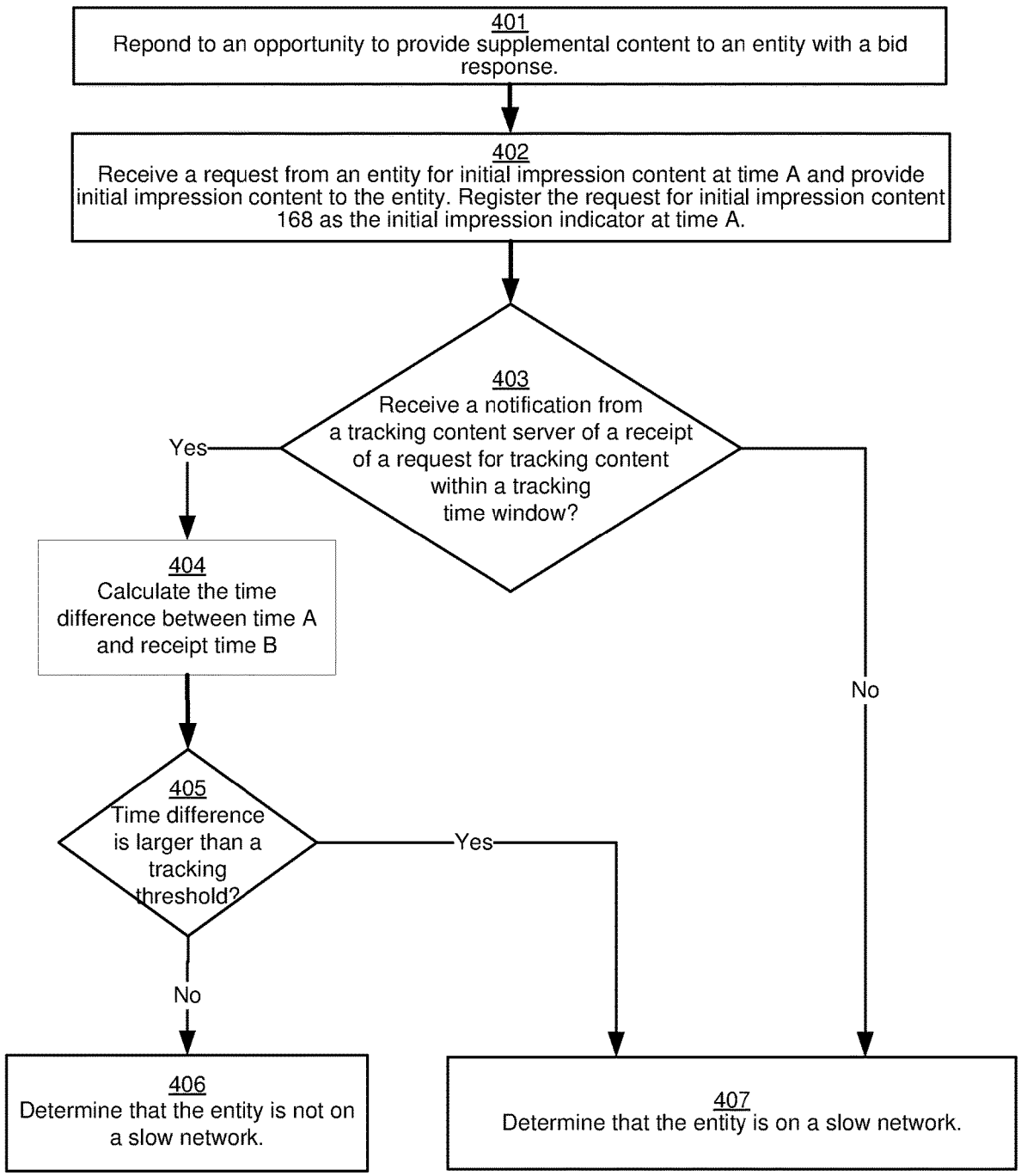
FIG. 4A is a flow chart illustrating a method to identify that an entity is retrieving supplemental content over a slow network, in accordance with an embodiment of the invention.

FIG. 4A is a flow chart illustrating a method to determine that entity 110 is retrieving supplemental content over a slow network, according to one embodiment of the invention described above.

At 401, respond on behalf of a campaign to an opportunity received from exchange 150 to provide supplemental content 132 to entity 110 by sending a bid response to exchange 150. The bid response includes a pointer to supplemental content instructions 131 on supplemental content server 130 to be provided by exchange 150 to entity 110 as redirect instructions if the opportunity is won. The redirect instructions instruct entity 110 to request supplemental content instructions 131 from supplemental content server 130.

At 402, receive at time A a request from entity 110 for initial impression content 168 corresponding to the opportunity and provide initial impression content 168 to entity 110. Register the request for initial impression content 168 as the initial impression indicator at time A.

At 403, determine whether a notification has been received from tracking content server 140 of a request for tracking content 141 corresponding to the opportunity, within a predetermined time window after time A (i.e., a "tracking time window").

At 404, wherein a notification from tracking content server 140 of a receipt of a request for tracking content 141 has been received at time B within the tracking time window, calculate the time difference between time A and time B.

At 405, determine whether the time difference is larger than a pre-determined amount of time (i.e., a "tracking threshold").

At 406, wherein the time difference is not larger than the tracking threshold, determine that entity 110 is not on a slow network.

At 407, wherein the time difference is larger than the tracking threshold, determine that entity 110 is on a slow network.

Also at 407, wherein a notification from tracking content server 140 of a receipt of a request for tracking content 141 corresponding to the opportunity has not been received within the tracking time window, determine that entity 110 is on a slow network.

Figure 4B:
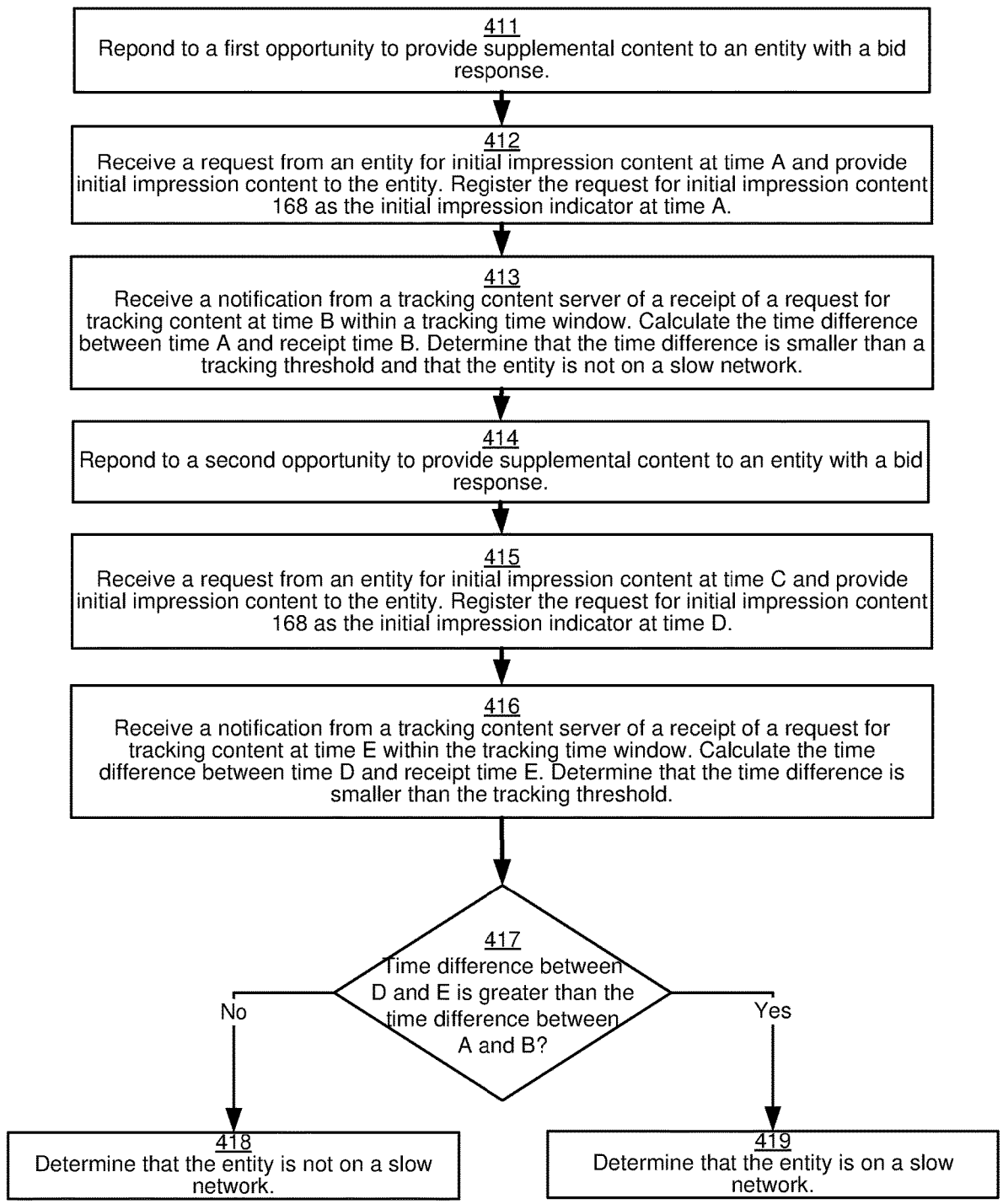
FIG. 4B is a flow chart illustrating a method to identify that an entity is retrieving supplemental content over a slow network, in accordance with another embodiment of the invention.

FIG. 4B is a flow chart illustrating a method to determine that entity 110 is retrieving supplemental content over a slow network, according to one embodiment of the invention described above.

At 411, respond on behalf of a campaign to a first opportunity received from exchange 150 to provide supplemental content 132 to entity 110 by sending a bid response to exchange 150. The bid response includes a pointer to supplemental content instructions 131 on supplemental content server 130 to be provided by exchange 150 to entity 110 as redirect instructions if the opportunity is won. The redirect instructions instruct entity 110 to request supplemental content instructions 131 from supplemental content server 130.

At 412, receive at time A a request from entity 110 for initial impression content 168 corresponding to the first opportunity and provide initial impression content 168 to entity 110. Register the request for initial impression content 168 as the first initial impression indicator at time A.

At 413, receive a notification from tracking content server 140 of a receipt of a request for tracking content 141 corresponding to the first opportunity at time B within a predetermined time window after time A (i.e., a "tracking time window"). Calculate the time difference between time A and time B. Determine that the time difference is smaller than a pre-determined amount of time (i.e., a "tracking threshold") and that entity 110 is not on a slow network.

At 414, respond on behalf of a campaign to a second opportunity received from exchange 150 to provide supplemental content 132 to entity 110 by sending a bid response to exchange 150. The bid response includes a pointer to supplemental content instructions 131 on supplemental content server 130 to be provided by exchange 150 to entity 110 as redirect instructions if the opportunity is won. The redirect instructions instruct entity 110 to request supplemental content instructions 131 from supplemental content server 130.

At 415, receive at time D a request from entity 110 for initial impression content 168 corresponding to the second opportunity and provide initial impression content 168 to entity 110. Register the request for initial impression content 168 as the second initial impression indicator at time D.

At 416, receive a notification from tracking content server 140 of a receipt of a request for tracking content 141 corresponding to the second opportunity at time E within the predetermined time window after time D (i.e., the "tracking time window"). Calculate the time difference between time D and time E. Determine that the time difference is smaller than the tracking threshold.

At 417, determine whether the time difference between D and E is greater than the time difference between A and B. In an alternate embodiment, determine whether the time difference between time D and time E is greater than the time difference between time A and time B by a predetermined threshold amount (i.e., an "increasing lag threshold").

At 418, wherein the time difference between D and E is not greater than the time difference between A and B, determine that entity 110 is not on a slow network. In the alternate embodiment, wherein the time difference between D and E is not greater than the time difference between A and B by the increasing lag threshold, determine that entity 110 is not on a slow network.

At 419, wherein the time difference between D and E is greater than the time difference between A and B, determine that entity 110 is on a slow network. In the alternate embodiment, wherein the time difference between D and E is greater than the time difference between A and B by the increasing lag threshold, determine that entity 110 is on a slow network.

Figure 5:
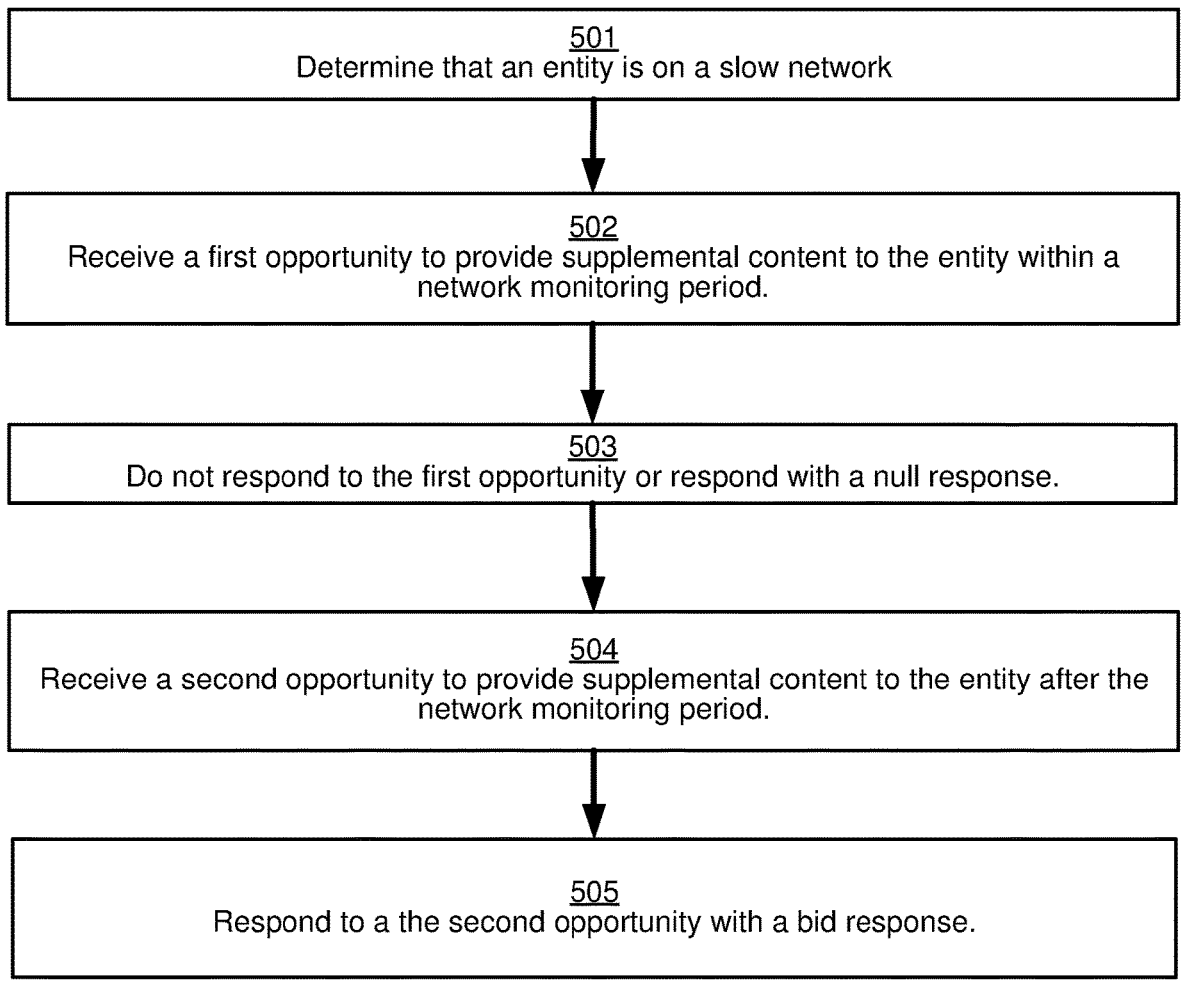
FIG. 5 is a flow chart illustrating a method to modify responses after identifying than an entity is retrieving supplemental content over a slow network, in accordance with an embodiment of the invention.

FIG. 5 is a flow chart illustrating a method to adjust responses to opportunities to provide supplemental content to entity 110 after determining that entity 110 is retrieving supplemental content 132 over a slow network, according to one embodiment of the invention described above.

At 501, determine that entity 110 is retrieving supplemental content 132 over a slow network.

At 502, receive a first opportunity to provide supplemental content 132 to entity 110 within a predetermined period of time following the determining that entity 110 is retrieving supplemental content 132 over a slow network (i.e., a "network monitoring period"). In an alternate embodiment, the network monitoring period may be a predetermined period of time following control system 160 sending a response, to an opportunity received from exchange 150 to provide supplemental content 132 to entity 110.

At 503, do not respond to the first opportunity, or respond with a null response.

At 504, receive a second opportunity to provide supplemental content 132 to entity 110 after the networking monitoring period has ended.

At 505, respond on behalf of a campaign to the second opportunity received from exchange 150 to provide supplemental content 132 to entity 110 by sending a bid response to exchange 150. The bid response includes a pointer to supplemental content instructions 131 on supplemental content server 130 to be provided by exchange 150 to entity 110 as redirect instructions if the opportunity is won. The redirect instructions instruct entity 110 to request supplemental content instructions 131 from supplemental content server 130.

Control system 160 may select the network monitoring period based on known characteristics of entity 110, the network, and campaigns that control system 160 responds on behalf of. A network monitoring period corresponding to a small amount of time (i.e., a "short network monitoring period") may be selected to closely monitor the network and quickly identify the point in time that entity 110 is no longer retrieving supplemental content 132 over a slow network. However, a short network monitoring window may cause control system 160 to continue to spend resources on opportunities that are not likely to result in an impression or a conversion. A network monitoring period corresponding to a large amount of time (i.e., a "long network monitoring period") may be selected to minimize wasting resources on opportunities that are not likely to result in an impression or a conversion. However, a long network monitoring window may cause a delay between the time that entity 110 moves off of a slow network and the time that control system 160 identifies that entity 110 has moved off a slow network. That may cause control system 160 to not respond with a bid response to, and thus miss, opportunities that are likely to result in an impression or a conversion.

Figure 6:
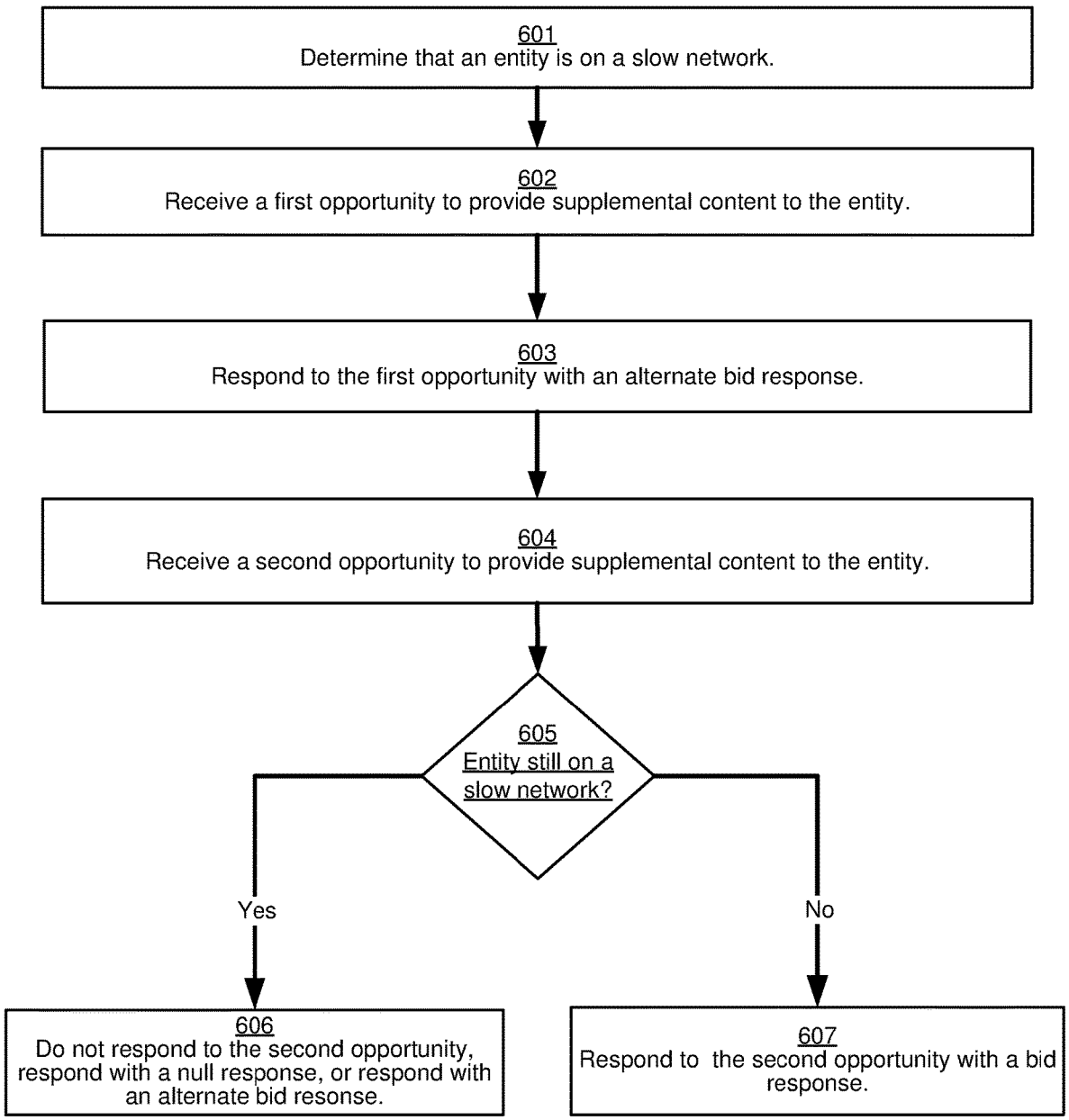
FIG. 6 is a flow chart illustrating a method to modify responses after identifying than an entity is retrieving supplemental content over a slow network, in accordance with another embodiment of the invention.

FIG. 6 is a flow chart illustrating a method to adjust responses to opportunities to provide supplemental content to entity 110 after determining that entity 110 is retrieving supplemental content 132 over a slow network, according to one embodiment of the invention described above.

At 601, determine that entity 110 is retrieving supplemental content 132 over a slow network.

At 602, receive a first opportunity from exchange 150 to provide supplemental content 132 to entity 110. In one embodiment, receive the first opportunity after a network monitoring period.

At 603, respond with a bid offer on behalf of a campaign to the first opportunity with an alternate bid response. In one embodiment, the alternate bid response comprises a pointer to alternate supplemental content instructions (not illustrated) on supplemental content server 130 to be provided by exchange 150 to entity 110 as redirect instructions if control system 160 wins the first opportunity. The redirect instructions instruct entity 110 to request alternate supplemental content instructions from supplemental content server 130. The alternate supplemental content instructions instruct entity 110 to retrieve and render alternate supplemental content (not illustrated) in place of supplemental content 132. Alternate supplemental content has a smaller file size and/or requires less bandwidth to be retrieved by entity 110 from supplemental content server 130 than supplemental content 132. In another embodiment, the alternate bid response comprises a lower bid amount than the original bid amount of the bid response corresponding to the determination that entity 110 is on a slow network. In another embodiment, the alternate bid response comprises a pointer to alternate supplemental content instructions and a lower bid amount.

At 604, receive a second opportunity from exchange 150 to provide supplemental content 132 to entity 110

At 605, determine whether the entity is still on a slow network based on the receipt and receipt times of initial impression indicator and tracking impression indicator corresponding to the first opportunity.

At 606, wherein the entity is still on a slow network, do not respond to the second opportunity, respond with a null response, or respond with a bid offer on behalf of a campaign to the second opportunity with an alternate bid response.

At 607, respond on behalf of a campaign to the second opportunity with a bid response comprising the original bid amount. The response includes a pointer to supplemental content instructions 131 on supplemental content server 130 to be provided by exchange 150 to entity 110 as redirect instructions if the second opportunity is won. The redirect instructions instruct entity 110 to request supplemental content instructions 131 from supplemental content server 130. The supplemental content instructions 131 instruct entity 110 to retrieve and render supplemental content 132.

ALTERNATE EMBODIMENTS

In an alternate embodiment, the above described invention can be used in a system where control system 160 directly acquires the opportunity to provide supplemental content 132 to entity 110 at publisher 120 (e.g., "premium inventory") on behalf of a campaign. In this alternate embodiment (the "premium inventory embodiment"), system 100 illustrated in FIG. 1 may not include exchange 150.

In the premium inventory embodiment, when entity 110 accesses publisher 120, entity 110 receives instructions from publisher 120 to retrieve primary content to be rendered by entity 110, and publisher 120 notifies control system 160 of an opportunity to provide supplemental content 132 to be rendered by entity 110.

In one example, control system 160 provides premium redirect instructions to entity 110, instructing entity 110 to retrieve and execute supplemental content instructions 131 from supplemental content server 130. Entity 110 receives and executes supplemental content instructions 131 which comprise instructions for entity 110 to request supplemental content 132 (which comprises supplemental impression content instructions 133) from supplemental content server 130, tracking content instructions 141 from tracking content server 140, and initial impression content 168 from control system 160. In another example, control system 160 provides premium direct instructions (not illustrated) to entity 110 to request supplemental content 132 (which comprises supplemental impression content instructions 133), tracking content instructions 141, and initial impression content 168.

In either example, entity 110 receives supplemental content 132 (which comprises supplemental impression content instructions 133) from supplemental content server 130, tracking content instructions 141 from tracking content server 140, and initial impression content 168 from control system 160. Once entity 110 receives and executes supplemental content 132 and tracking content instructions 141, and receives and renders initial impression content 160, control system 160 determines whether entity 110 is on a slow network and modifies responses to opportunities to provide supplemental content to entity 110.

FIG. 2 illustrates a method for determining the receipt and receipt times of an initial impression indication, tracking impression indication, and supplemental impression indication, in accordance with the premium inventory embodiment of the invention. In the example where entity 110 received and executed premium direct instructions from control system 160, the method begins at 203.

FIG. 3A is an example of tracking content request instructions included as part of supplemental content instructions 131 and FIG. 3B is an example of tracking impression instructions 141 sent by tracking content server 140 to entity 110, in accordance with the premium inventory embodiment of the invention.

Figure 7A:
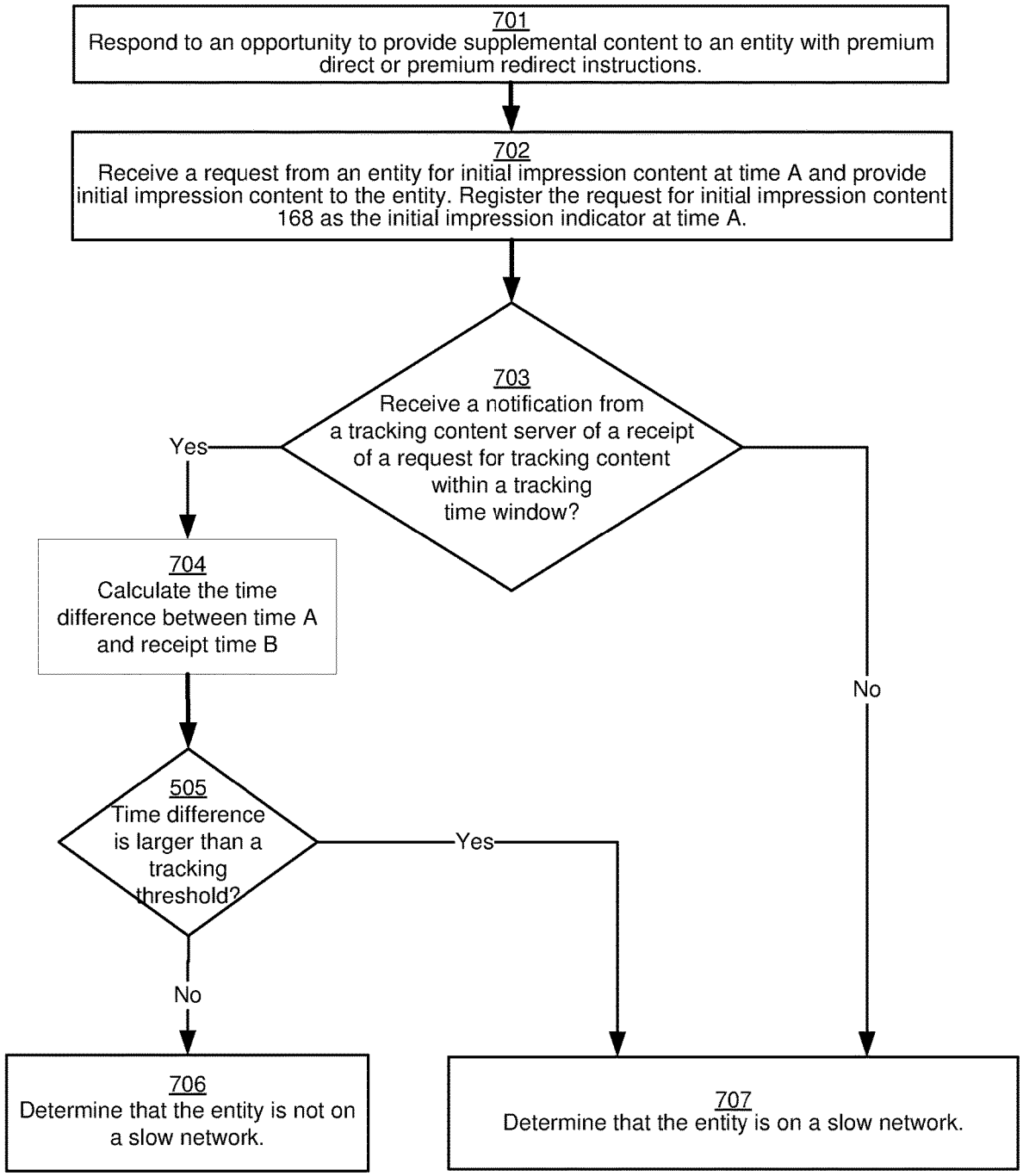
FIG. 7A is a flow chart illustrating a method to identify that an entity is retrieving supplemental content over a slow network, in accordance with an embodiment of the invention.

FIG. 7A is a flow chart illustrating a method to determine that entity 110 is retrieving supplemental content over a slow network, according to the premium inventory embodiment. The method is the same as described with respect to FIG. 4A above except in the premium inventory embodiment, at step 701, respond to an opportunity to provide supplemental content to an entity with premium direct or premium redirect instructions.

Figure 7B:
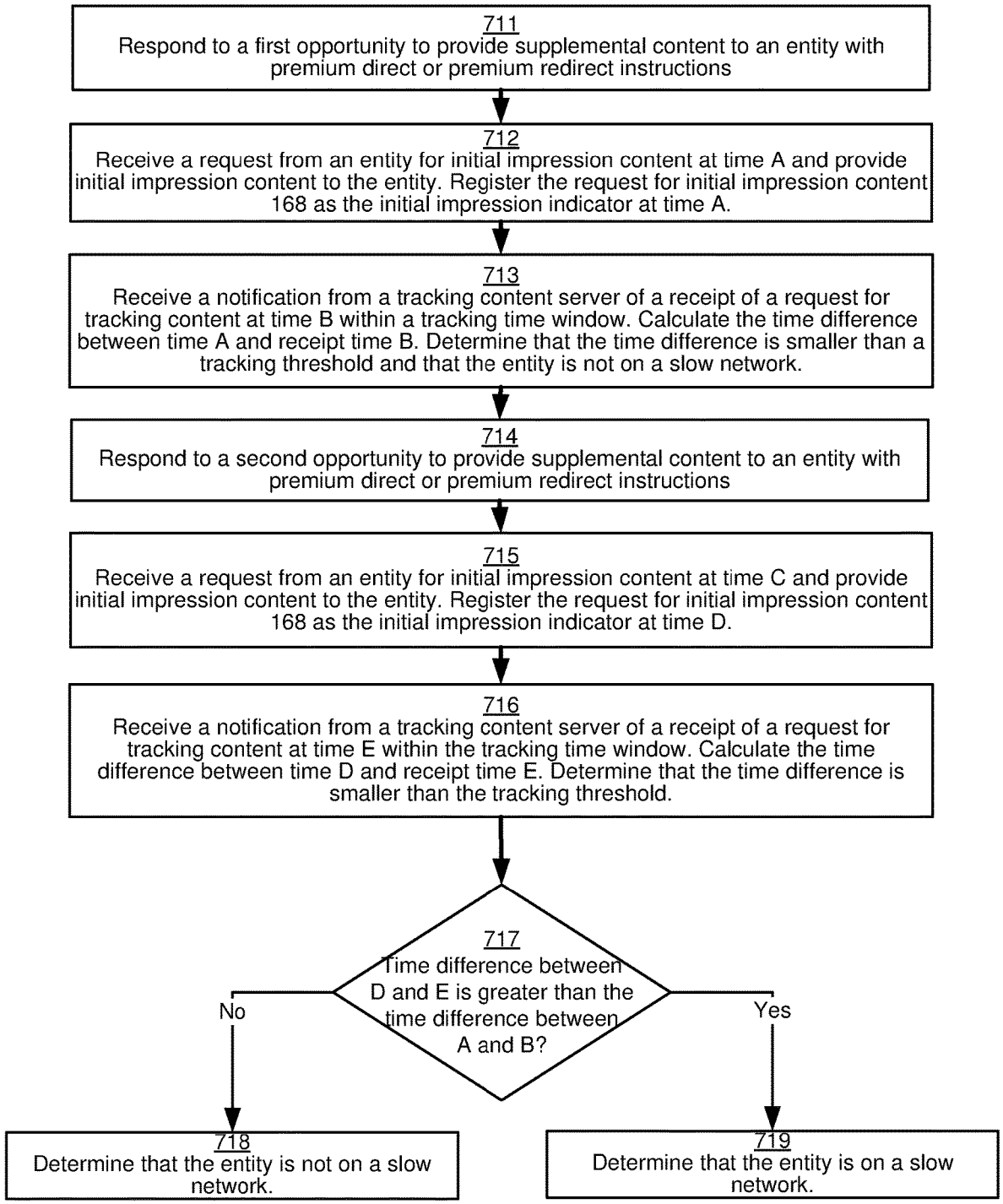
FIG. 7B is a flow chart illustrating a method to identify that an entity is retrieving supplemental content over a slow network, in accordance with another embodiment of the invention.
Figure 8:
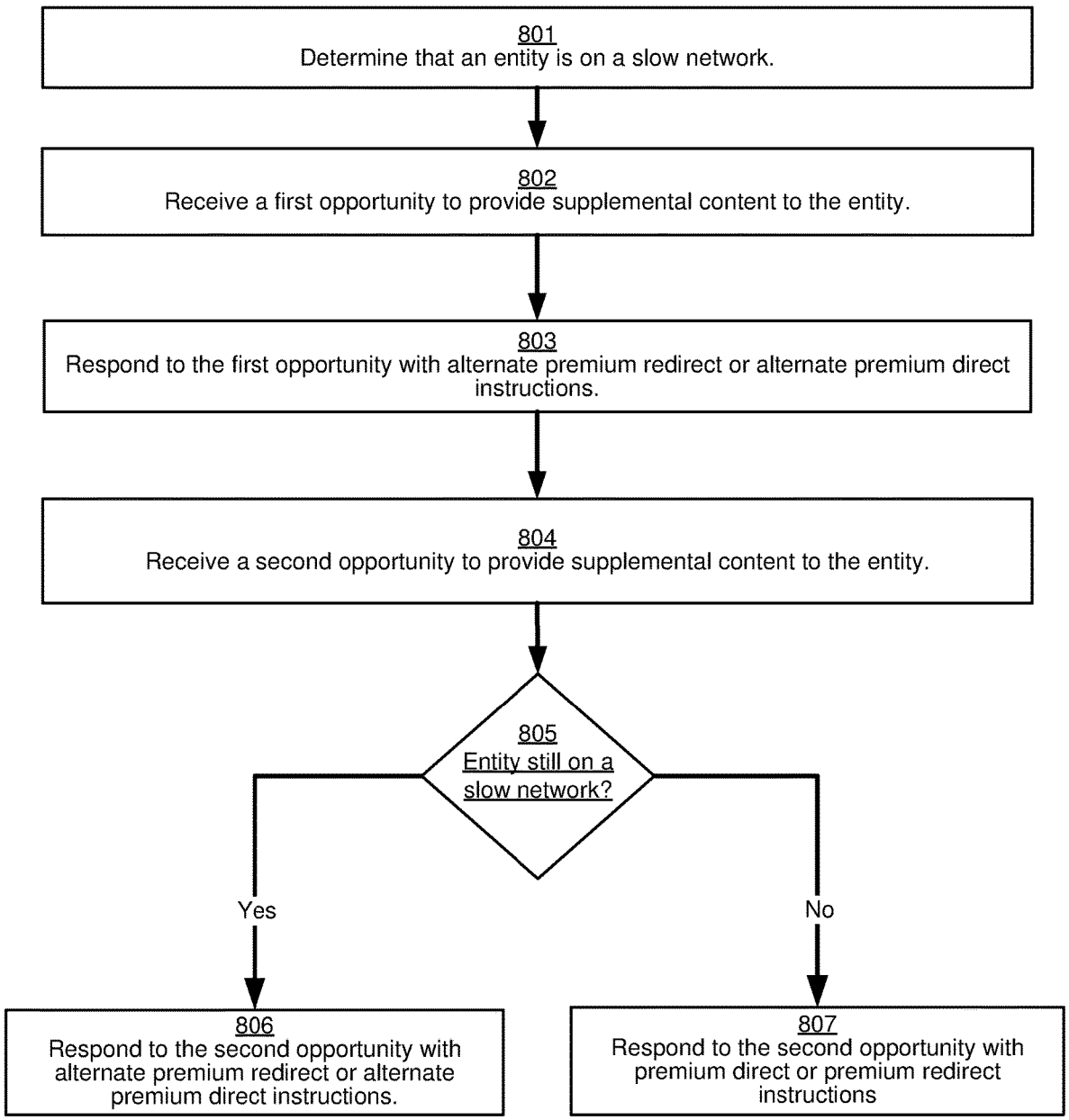
FIG. 8 is a flow chart illustrating a method to modify responses after identifying than an entity is retrieving supplemental content over a slow network, in accordance with another embodiment of the invention.

FIG. 7B is a flow chart illustrating a method to determine that entity 110 is retrieving supplemental content over a slow network, according to the premium inventory embodiment. The method is the same as described with respect to FIG. 4B above except in the premium inventory embodiment, at step 711, respond to a first opportunity to provide supplemental content to an entity with premium direct or premium redirect instructions, and at step 714, respond to a second opportunity to provide supplemental content to an entity with premium direct or premium redirect instructions FIG. 8 is a flow chart illustrating a method to adjust responses to opportunities to provide supplemental content to entity 110 after determining that entity 110 is retrieving supplemental content 132 over a slow network, according to the premium inventory embodiment of the invention. The method is the same as described with respect to FIG. 6 above except in the premium inventory embodiment, at step 803, respond to the first opportunity with alternate premium redirect or alternate premium direct instructions; at step 806, respond to the second opportunity with alternate premium redirect or alternate premium direct instructions; and at step 807, respond to the second opportunity with premium redirect or premium direct instructions. Alternate premium redirect instructions instruct entity 110 request alternate supplemental content instructions (not illustrated) from supplemental content server 130. The alternate supplemental content instructions instruct entity 110 to retrieve and render alternate supplemental content (not illustrated) in place of supplemental content 132. Alternate premium direct instructions instruct entity 110 retrieve and render alternate supplemental content (not illustrated) from supplemental content server 130 in place of supplemental content 132. Alternate supplemental content has a smaller file size and/or requires less bandwidth to be retrieved by entity 110 from supplemental content server 130 than supplemental content 132.

In an alternate embodiment, the above described invention can be used in a system where exchange 150 identifies that entity 110 is on a slow or faulty network, and selects a winning bid corresponding to supplemental content 132 that requires less bandwidth to use. Exchange 150 receives responses to opportunities to provide supplemental content 132 to entity 110 from multiple campaign managers and/or campaign control systems. Exchange 150 selects the winning response based on one or more factors, for example, the corresponding bid amount. Exchange 150 may determine whether entity 110 is on a slow network. In one embodiment, exchange 150 uses the techniques described above to determine whether entity 110 is on a slow network. In this embodiment, exchange 150 comprises the tracking impression module 162, including initial impression content 168, and network evaluation module 163. In this embodiment, exchange 150 may comprise tracking content instructions 141 and tracking content 142. In this embodiment, exchange 150 uses the techniques described above to determine whether entity 110 is on a slow network. In another embodiment, exchange 150 receives notification that entity 110 is on a slow network. In an example, exchange 150 may receive notification from control system 160 that entity 110 is on a slow network, for example, as part of the response by control system 160 to the opportunity. When exchange 150 determines that entity 110 is on a slow network, exchange 150 may select a response as the winning response based on the size of corresponding supplemental content 132. For example, exchange 150 may select as a winning response a response corresponding to a static display with a lower bid amount even though a response corresponding to a video display may have a higher bid amount. In this example, exchange 150 may filter out responses corresponding to video displays, and thus select a winning response from responses corresponding to static displays. Exchange 150 may know the size of supplemental content 132 based on the corresponding ad server 130 (e.g., a video ad server or a static display ad server), the supplemental content manager corresponding to ad server 130, or based on information provided in the responses.

It is noted that similar techniques as those described above can be used in the context of other kinds of real-time networked exchanges and/or auction systems. Such techniques are particularly useful where timely responses to notifications, given variable timeout periods, network delays, task execution time, and/or resource availability, are desirable.

Figure 9:
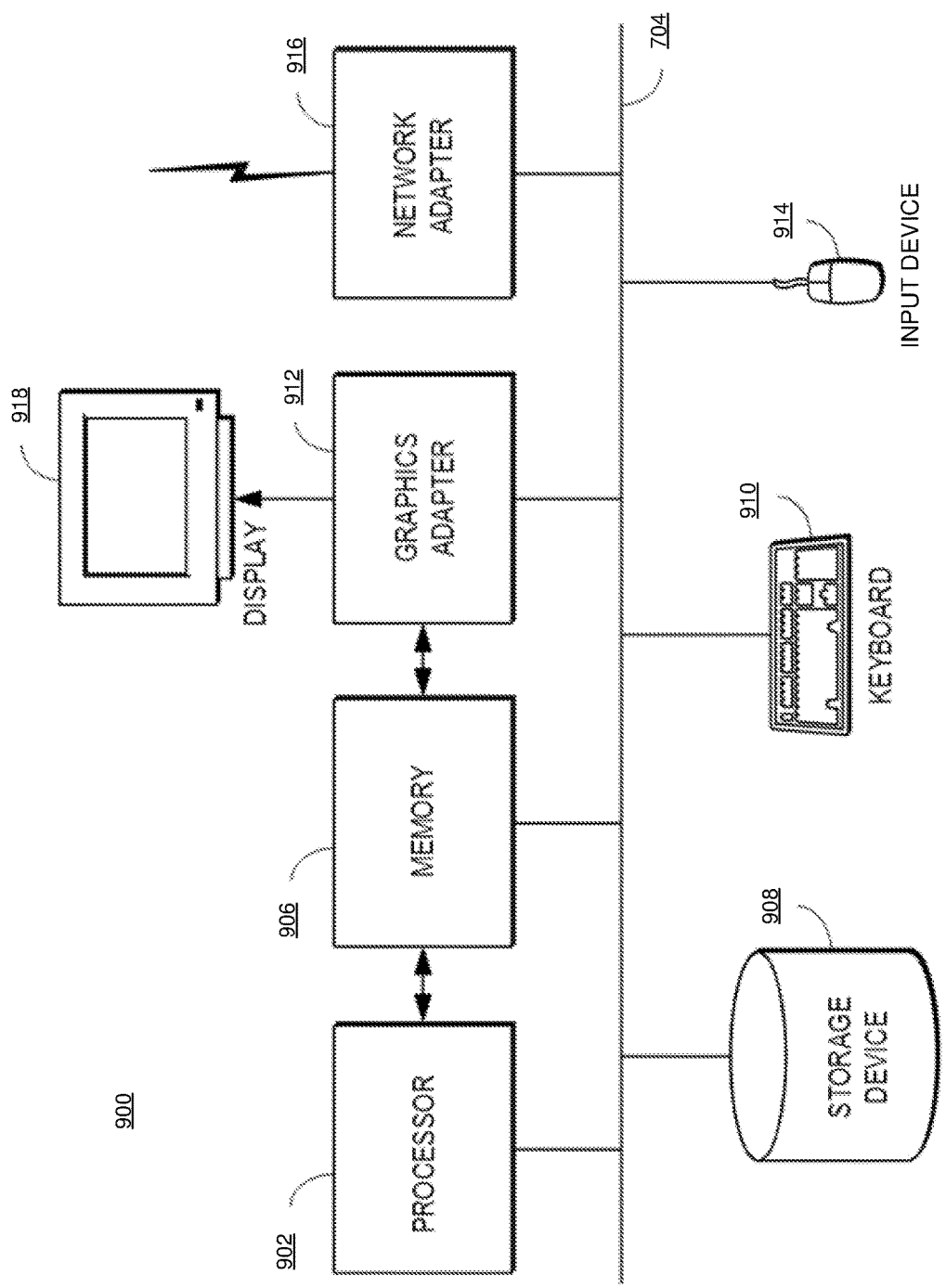
FIG. 9 is a high-level block diagram illustrating an example of a computer for use as a component of a system to identify that an entity is retrieving supplemental content over a slow network and to modify responses accordingly, in accordance with an embodiment of the invention The figures depict embodiments of the present invention for purposes of illustration only. One skilled in the art will

FIG. 9 is a high-level block diagram illustrating an example of a computer for use as entity 110, publisher 120, supplemental content server 130, tracking content server 140, exchange 150, and/or control system 160 of FIG. 1. Illustrated are a processor 902 coupled to a bus 904. Also coupled to the bus 904 are a memory 906, a storage device 908, a keyboard 910, a graphics adapter 912, an input device 914, and a network adapter 916. A display 918 is coupled to the graphics adapter 912.

Processor 902 may be any general-purpose processor. Processor 902 is the hardware logic circuitry of the computer 900 that processes instructions such as computer programs to operate on data. Memory 906 may be, for example, firmware, read-only memory (ROM), non-volatile random access memory (NVRAM), and/or RAM, and holds instructions and data used by the processor 902. Storage device 908 is any non-transitory computer-readable storage medium, such as a hard drive, compact disk read-only memory (CD-ROM), DVD, or a solid-state memory device. Graphics adapter 912 displays images and other information on the display 918. Input device 914 may be a mouse, track ball, stylus, touchscreen, or other type of input device, and is used in combination with the keyboard 910 to input data into the computer 900. Network adapter 916 couples computer 900 to a network (not shown). The network may be a local area network, a wide area network, a wireless network, an intranet, a cable network, a satellite network, a cellular phone network, an optical network, and/or the Internet, and/or combinations thereof.

As is known in the art, a computer 900 can have different and/or other components than those shown in FIG. 9. In addition, the computer 900 can lack certain illustrated components. In one embodiment, a computer 900 acting as a server may lack an input device 910, a graphics adapter 914, and/or a display 916. Moreover, the storage device 908 can be local and/or remote from the computer 900 (such as embodied within a storage area network (SAN)).

As is known in the art, the computer 900 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 908, loaded into the memory 906, and executed by the processor 902. The functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience.

This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed:

1. A method, comprising:
   receiving a first notification, from an exchange by a control system, of a first opportunity to provide supplemental content to a browser;
   responding, by the control system, to the first notification by sending a first response pointing to instructions that, executed by the browser, cause the browser to request and retrieve:
      from the control system, an initial impression content;
      from a supplemental content server, a first supplemental content; and
      from a tracking server, a tracking content;
      wherein the supplemental content server and the tracking server are on a different domain than the control system and wherein the supplemental content server and the tracking server are on different domains;
   receiving, by the control system from the browser, the request for the initial impression content at a first time;
   not receiving a first indication, before the end of a first predetermined period of time after the first time, by the control system from the tracking server, that the tracking content was requested by the browser; and
   at a second time, after the end of the first predetermined period of time after the first time, receiving, from the exchange by the control system, a second notification of a second opportunity to provide supplemental content to the browser; and
   responding, by the control system, to the second notification by sending a second response pointing to instructions that, executed by the browser, cause the browser to request and retrieve from the supplemental content server, a second supplemental content, wherein the second supplemental content requires less networking capabilities to retrieve than the first supplemental content.

2. The method of claim 1, wherein the first supplemental content is a video display and the second supplemental content is a static display.

3. The method of claim 1, wherein the first supplemental content has larger file size than the second supplemental content.

4. The method of claim 1, wherein receiving, by the control system, the second notification further comprises receiving the second notification within a second predetermined period of time after the second time.

5. The method of claim 4, further comprising:
   receiving a third notification, by the control system, after the end of the second pre-determined period of time after the second time, of a third opportunity to provide supplemental content to the browser; and
   responding to the third opportunity by sending a third response pointing to instructions that, executed by the browser, cause the browser to request and retrieve, from the supplemental content server, the first supplemental content.

6. The method of claim 5, wherein the control system receives the first, second, and third notifications from an exchange.

7. A non-transitory computer-readable storage medium storing processor-executable computer program instructions that, when executed, cause a computer processor to perform a method, the method comprising:
   receiving a first notification, from an exchange by a control system, of a first opportunity to provide supplemental content to a browser;
   responding, by the control system, to the first notification by sending a first response pointing to instructions that, executed by the browser, cause the browser to request and retrieve:
      from the control system, an initial impression content;
      from a supplemental content server, a first supplemental content; and
      from a tracking server, a tracking content;
      wherein the supplemental content server and the tracking server are on a different domain than the control system and wherein the supplemental content server and the tracking server are on different domains;
   receiving, by the control system from the browser, the request for the initial impression content at a first time;
   not receiving a first indication, before the end of a first predetermined period of time after the first time, from the exchange by the control system from the tracking server, that the tracking content was requested by the browser; and
   at a second time, after the end of the first predetermined period of time after the first time, receiving, by the control system, a second notification of a second opportunity to provide supplemental content to the browser; and
   responding, by the control system, to the second notification by sending a second response pointing to instructions that, executed by the browser, cause the browser to request and retrieve from the supplemental content server, a second supplemental content, wherein the second supplemental content requires less networking capabilities to retrieve than the first supplemental content.

8. The non-transitory computer-readable storage medium of claim 1, wherein the first supplemental content is a video display and the second supplemental content is a static display.

9. The non-transitory computer-readable storage medium of claim 1, wherein the first supplemental content has larger file size than the second supplemental content.

10. The non-transitory computer-readable storage medium of claim 1, wherein receiving, by the control system, the second notification further comprises receiving the second notification within a second predetermined period of time after the second time.

11. The non-transitory computer-readable storage medium of claim 10, wherein the method further comprises:
receiving a third notification, by the control system, after the end of the second pre-determined period of time after the second time, of a third opportunity to provide supplemental content to the browser; and
responding to the third opportunity by sending a third response pointing to instructions that, executed by the browser, cause the browser to request and retrieve, from the supplemental content server, the first supplemental content.

12. The non-transitory computer-readable storage medium of claim 11, wherein the control system receives the first, second, and third notifications from an exchange.

13. A system comprising:
a processor; and
a non-transitory computer-readable storage medium storing processor-executable computer program instructions that, when executed, cause a computer processor to perform a method, the method comprising:
receiving a first notification, from an exchange by a control system, of a first opportunity to provide supplemental content to a browser;
responding, by the control system, to the first notification by sending a first response pointing to instructions that, executed by the browser, cause the browser to request and retrieve:
from the control system, an initial impression content;
from a supplemental content server, a first supplemental content; and
from a tracking server, a tracking content;
wherein the supplemental content server and the tracking server are on a different domain than the control system and wherein the supplemental content server and the tracking server are on different domains;
receiving, by the control system from the browser, the request for the initial impression content at a first time;
not receiving a first indication, before the end of a first predetermined period of time after the first time, by the control system from the tracking server, that the tracking content was requested by the browser; and
at a second time, after the end of the first predetermined period of time after the first time, receiving, from the exchange by the control system, a second notification of a second opportunity to provide supplemental content to the browser; and
responding, by the control system, to the second notification by sending a second response pointing to instructions that, executed by the browser, cause the browser to request and retrieve from the supplemental content server, a second supplemental content, wherein the second supplemental content requires less networking capabilities to retrieve than the first supplemental content.

14. The system of claim 13, wherein the first supplemental content is a video display and the second supplemental content is a static display.

15. The system of claim 13, wherein the first supplemental content has larger file size than the second supplemental content.

16. The system of claim 13, wherein receiving, by the control system, the second notification further comprises receiving the second notification within a second predetermined period of time after the second time.

17. The system of claim 16, further comprising:
receiving a third notification, by the control system, after the end of the second pre-determined period of time after the second time, of a third opportunity to provide supplemental content to the browser; and
responding to the third opportunity by sending a third response pointing to instructions that, executed by the browser, cause the browser to request and retrieve, from the supplemental content server, the first supplemental content.

18. The system of claim 17, wherein the control system receives the first, second, and third notifications from an exchange.

* * * * *